United States Patent
Cai et al.

(10) Patent No.: US 10,042,192 B2
(45) Date of Patent: Aug. 7, 2018

(54) ELECTRO-ABSORPTION MODULATOR WITH LOCAL TEMPERATURE CONTROL

(71) Applicant: Futurewei Technologies, Inc., Plano, TX (US)

(72) Inventors: Yan Cai, Leuven (BE); YuSheng Bai, Los Altos Hills, CA (US); Hongbing Lei, San Jose, CA (US); Xiao Andy Shen, San Bruno, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/362,554

(22) Filed: Nov. 28, 2016

(65) Prior Publication Data
US 2018/0149890 A1 May 31, 2018

(51) Int. Cl.
| | | |
|---|---|---|
| *H04B 10/077* | (2013.01) | |
| *G02F 1/025* | (2006.01) | |
| *G08C 23/04* | (2006.01) | |
| *G02F 1/015* | (2006.01) | |

(52) U.S. Cl.
CPC ............ *G02F 1/025* (2013.01); *G08C 23/04* (2013.01); *H04B 10/0775* (2013.01); *G02F 2001/0155* (2013.01); *G02F 2203/60* (2013.01)

(58) Field of Classification Search
CPC .................................................. H04B 10/0775
See application file for complete search history.

(56) References Cited

U.S. PATENT DOCUMENTS

| | | | | |
|---|---|---|---|---|
| 6,195,191 B1 * | 2/2001 | Osenbach | ............... | G02B 1/02 359/238 |
| 6,516,017 B1 * | 2/2003 | Matsumoto | ........... | H01S 5/0265 372/20 |
| 6,730,270 B1 * | 5/2004 | O'Connor | ............ | G01N 27/125 422/50 |
| 8,160,404 B2 * | 4/2012 | Pan | ........................ | G02F 1/025 385/129 |
| 8,638,485 B2 * | 1/2014 | Feng | ..................... | G02F 1/0147 359/238 |
| 8,699,533 B1 * | 4/2014 | Wach | .................. | H01S 5/02212 372/34 |
| 8,824,036 B2 * | 9/2014 | Manipatruni | .......... | G02F 1/011 359/239 |

(Continued)

OTHER PUBLICATIONS

Cai, Yan, "OI40 High-Speed GESI Electro-Absorption Modulators", IMEC Partner Technical Week presentation, (Oct. 2015), 20 pgs.

*Primary Examiner* — Danny Leung
(74) *Attorney, Agent, or Firm* — Schwegman Lundberg & Woessner, P.A.

(57) ABSTRACT

Methods, apparatus, and systems are provided including an electro-absorption modulator (EAM) with local temperature control for optical communication. One aspect provides an optical EAM including a semiconductor portion configured to modulate light for transmission or reception of an optical signal. The modulator includes a temperature sensing element configured to sense temperature and to provide an output signal based on the sensed temperature, and a temperature control element configured to control temperature of the semiconductor portion based on the output signal from the temperature sensing element. In one example, the semiconductor portion includes germanium silicon (GeSi).

21 Claims, 7 Drawing Sheets

(56) References Cited

U.S. PATENT DOCUMENTS

| | | | | |
|---|---|---|---|---|
| 2003/0012244 | A1* | 1/2003 | Krasulick | B82Y 20/00 372/50.1 |
| 2005/0224946 | A1* | 10/2005 | Dutta | G02B 6/12002 257/686 |
| 2006/0251801 | A1* | 11/2006 | Weidman | B82Y 30/00 427/99.5 |
| 2007/0081565 | A1* | 4/2007 | Sasada | H04B 10/504 372/28 |
| 2010/0204605 | A1* | 8/2010 | Blakley | A61B 5/01 600/549 |
| 2014/0079083 | A1* | 3/2014 | Mizuseki | H01S 5/06804 372/34 |
| 2014/0376579 | A1* | 12/2014 | Wach | H01S 5/02212 372/34 |
| 2015/0195884 | A1* | 7/2015 | Angelin | H05B 33/0848 315/185 R |
| 2016/0146909 | A1* | 5/2016 | Kawabata | G01R 33/26 324/304 |
| 2017/0269391 | A1* | 9/2017 | Feng | G02F 1/025 |

* cited by examiner

ELECTRO-ABSORPTION MODULATOR WITH LOCAL TEMPERATURE CONTROL

TECHNICAL FIELD

The present disclosure relates to optical communication, and in particular to an electro-absorption modulator (EAM) with local temperature control for optical communication.

BACKGROUND

In optical networks, signals may be transmitted at various wavelengths, with each wavelength corresponding to a transmission channel. Optical links may connect network nodes so that signals may be transmitted throughout the optical network. An optical path may use a series of network nodes and optical links to connect a source (e.g., a transmitter) of an optical transmission with a destination (e.g. a receiver) for the optical transmission.

With advancements in technology, such as 5G mobility, 4K video, Internet of Things (IoT) communication and virtual reality (VR) games, new interactive applications will increasingly generate and consume enormous amounts of data. These large amounts of data in turn cause dramatic growth in network traffic, which requires larger bandwidth to minimize and reduce delays. In order to keep up with demands and ensure these that new technologies are economically efficient and operationally simple, photonic integrated circuits such as communication transceivers should operate with high efficiency independent of environmental temperature changes.

SUMMARY

Methods, apparatus, and systems are provided including an electro-absorption modulator (EAM) with local temperature control for optical communication. One aspect provides an optical EAM including a semiconductor portion configured to modulate light for transmission or reception of an optical signal. The modulator includes a temperature sensing element configured to sense temperature and to provide an output signal based on the sensed temperature, and a temperature control element configured to control temperature of the semiconductor portion based on the output signal from the temperature sensing element. In one embodiment, the semiconductor portion includes germanium silicon (GeSi). Other types of semiconductors can be used without departing from the scope of the present subject matter.

According to various embodiments, the temperature sensing element is configured to sense environmental temperature. The temperature sensing element is configured to sense temperature of the GeSi portion, in various embodiments. In various embodiments, the temperature control element includes Tungsten (W), titanium nitride (TiN), and/or doped silicon (Si). The temperature control element is configured to function as a resistor to increase temperature of the GeSi portion using current injection, in various embodiments.

Another aspect provides an optical integrated circuit including an optical electro-absorption modulator including a germanium silicon (GeSi) portion configured to modulate light for transmission or reception of an optical signal. The integrated circuit includes a temperature sensing element within the modulator configured to sense environmental temperature of the modulator and to provide an output signal based on the sensed temperature, and a temperature control element within the modulator configured to control temperature of the GeSi portion based on the output signal from the temperature sensing element. According to various embodiments, the temperature sensing element includes doped silicon (Si) and/or a metal. The temperature sensing element includes resistance-based temperature sensing, in various embodiments. In one embodiment, temperature sensing is based on the singularity relationship between resistance and temperature.

A further aspect provides an optical communication system including an optical input, an optical output, and an optical electro-absorption modulator (EAM) configured to connect the optical input to the optical output. The optical EAM includes a germanium silicon (GeSi) portion configured to modulate light for transmission or reception of an optical signal. The optical EAM further includes a temperature sensing element configured to sense temperature of the GeSi portion and to provide an output signal based on the sensed temperature, and a temperature control element configured to control temperature of the GeSi portion based on the output signal from the temperature sensing element.

According to various embodiments, the optical input includes a chip-to-chip level communication. The optical input includes a board-to-board level communication, in various embodiments. The optical EAM is configured to be incorporated into an optical transceiver, in an embodiment. In various embodiments, the temperature sensing element is further configured to sense environmental temperature.

Another aspect provides a method including providing an optical electro-absorption modulator (EAM) including a semiconductor portion configured to modulate light for transmission or reception of an optical signal. The method also includes providing a temperature sensing element within the modulator configured to sense temperature and to provide an output signal based on the sensed temperature, and providing a temperature control element within the modulator configured to control temperature of the semiconductor portion based on the output signal from the temperature sensing element. In one embodiment, the semiconductor portion includes germanium silicon (GeSi).

According to various embodiments, the temperature sensing element is configured to sense environmental temperature. The temperature sensing element is configured to sense temperature of the semiconductor portion, in various embodiments. In one embodiment, the temperature sensing element is configured to sense both temperature of the GeSi portion, and environmental or ambient temperature. The EAM is configured to operate at approximately 70 degrees C., and if the temperature sensing element senses a temperature below 55 degrees C., the temperature control element is configured to begin heating the EAM, in an embodiment. Other temperature ranges can be used without departing from the scope of the present subject matter.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

With the advancements in technology, such as 5G mobility, 4K video, Internet of Things (IoT) communication and virtual reality (VR) games, new interactive applications will increasingly generate and consume enormous amounts of data. These large amounts of data in turn cause dramatic growth in network traffic, which requires larger bandwidth to minimize and reduce delays. In order to keep up with demands and ensure these that new technologies are economically efficient and operationally simple, photonic integrated circuits such as communication transceivers should operate with high efficiency independent of environmental temperature changes.

Figure 2:
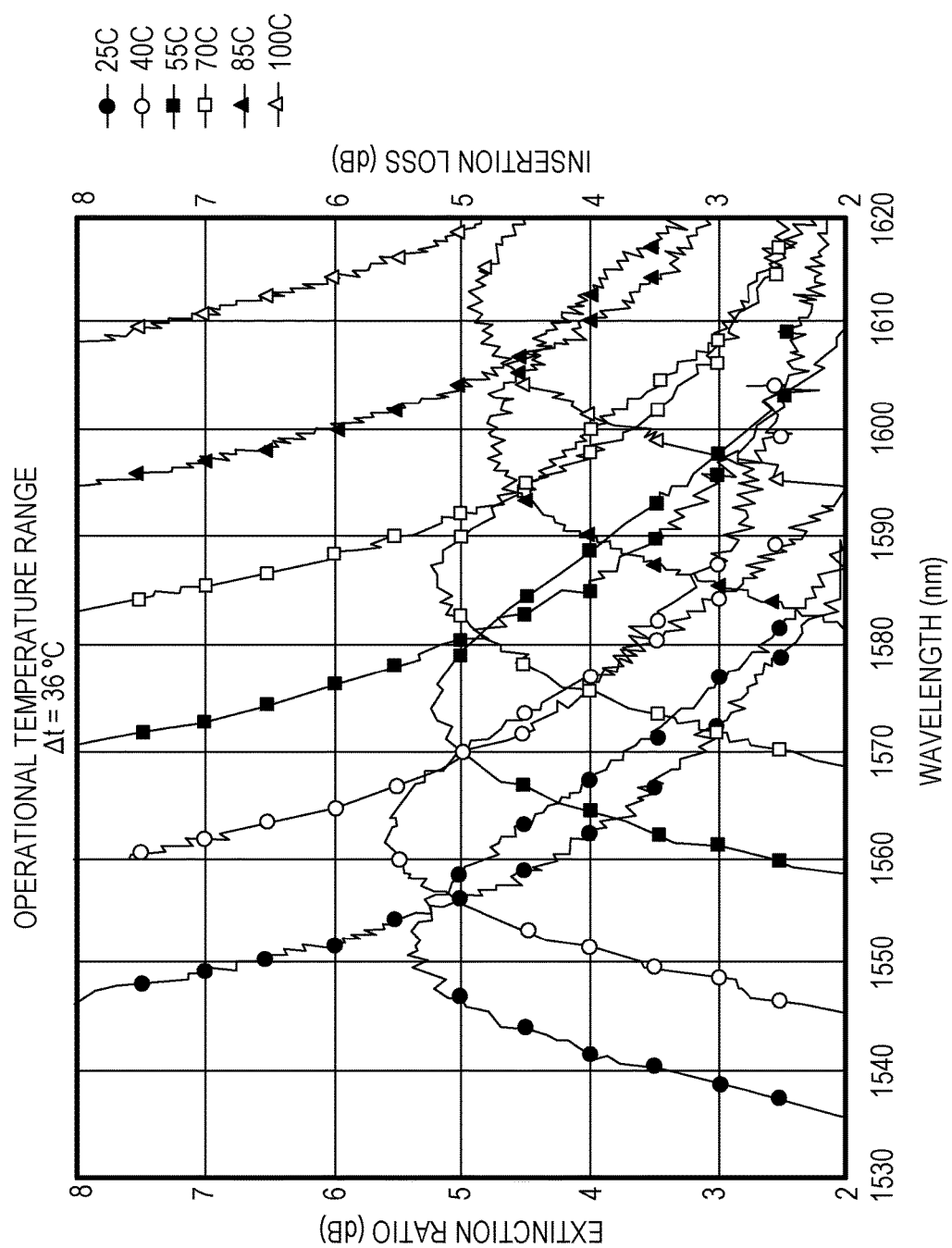
FIG. 2 is a graph illustrating operational temperature range of a germanium silicon (GeSi) electro-absorption modulator.

The typical germanium silicon (GeSi) electro-absorption modulator has temperature dependence with the insertion loss and extinction ratio wavelength shift rate of around 0.75~0.9 nm/° C. FIG. 2 is a graph illustrating operational temperature range of a GeSi electro-absorption modulator. The operational temperature range can be calculated by using an optical bandwidth divided by an operational shift rate (for example 0.82 nm/degree C., as shown in FIG. 2). Considering a typical electro-absorption modulator (EAM) which has a 30 nm optical bandwidth, the device can work with a reasonable performance in the temperature range of 33~40° C. If there is a larger environmental temperature variation, the device performance will degrade without a temperature control. The present subject matter, using an integrated heater and sensor for the EAM, can maintain the electro-absorption modulator to work in a large temperature range with non-degraded modulator performance. The present subject matter can also compensate for process variation in terms of Si composition in the GeSi material, which enables a larger process window. In various embodiments, the present subject matter can be used as a light modulation element in photonic integrated circuits for datacom and telecom applications.

The present subject matter provides, among other things, a thermally controlled electro-absorption modulator (EAM) configured to maintain operational temperature to be thermally stable while subject to a large environmental temperature change. In an embodiment, the present subject matter provides a thermally controlled Ge(Si) EAM device configured to operate under a controlled temperature range. In various embodiments, the EAM can be used as an optical modulator for use in an optical transceiver. The present subject matter is used in photonic integrated circuits for intra-data center, backplane or board optical communication, in various embodiments. The optical modulator of the present subject matter provides for a smaller footprint, higher speed, lower power consumption and lower cost device for optical transmission and/or reception.

In one embodiment, the present subject matter provides a Ge(Si) electro-absorption modulator (EAM) with integrated heater and sensor to achieve local temperature control for photonics integrated circuits. The Ge(Si) EAM is an optical modulator configured to be used in photonics integrated circuits due to its small footprint, low power consumption, high operating speed and easy integration with other Si-based optical components. Si or silicon nitride (SiNx) waveguide based Ge(Si) EAMs on Si or SOI (silicon-on-insulator) substrates can modulate light in C-band wavelength range by applying an electrical field to GeSi material, and can be used for optical communication in O-band, C-band or L-band wavelength range based on the Si concentration in the GeSi material, in various embodiments.

In various embodiments, a thermally controlled Ge(Si) electro-absorption modulator for maintaining a desired temperature range includes a GeSi electro-absorption modulator, a temperature sensing element and corresponding circuit that senses the temperature of the electro-absorption modulator and provides an output signal indicating the temperature, and a temperature heating element and corresponding current controlling circuit that modulates current to the heating element while the current controlling circuit is responsive to the output of the temperature sensing circuit.

Figure 1:
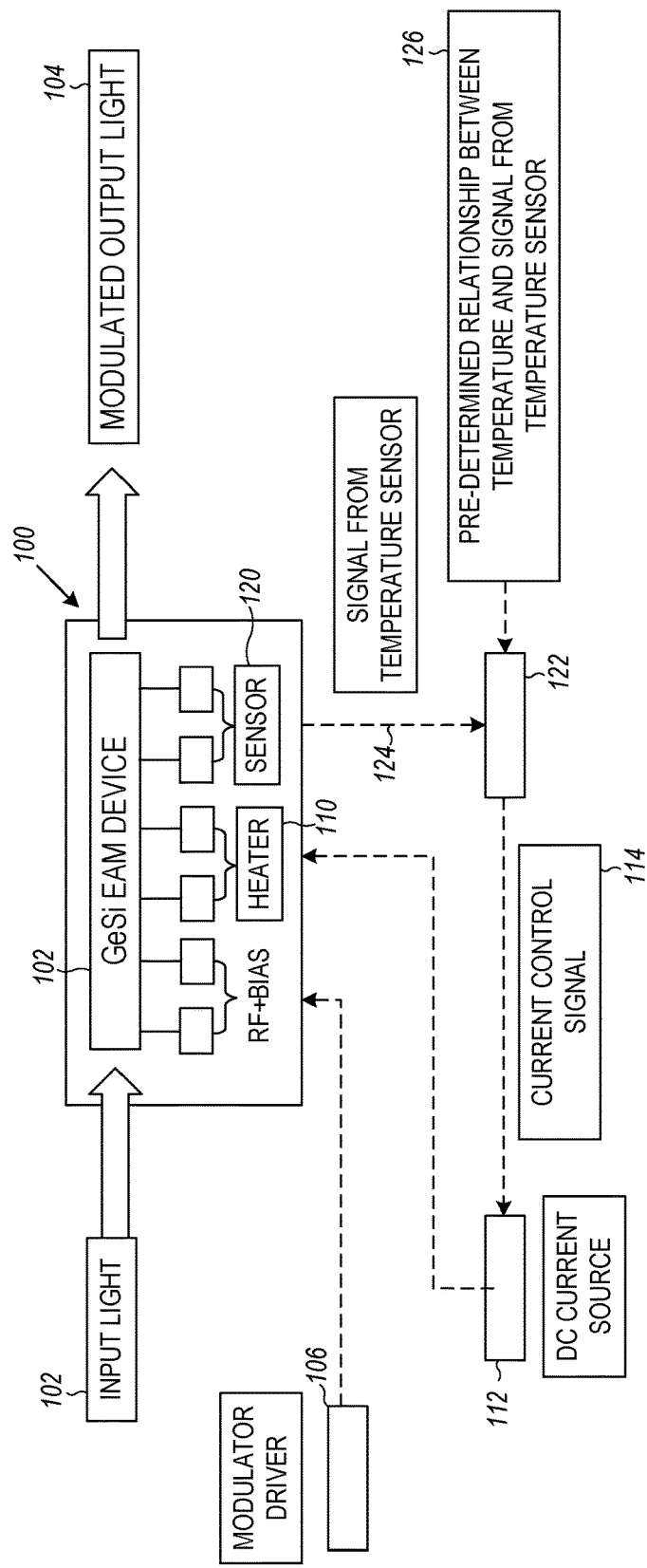
FIG. 1 is a circuit diagram illustrating a thermally controlled electro-absorption modulator for maintaining a desired temperature range during operation, according to various embodiments.

FIG. 1 is a circuit diagram illustrating a thermally controlled electro-absorption modulator (EAM) for maintaining a desired temperature range during operation, according to various embodiments. The EAM 100 receives an optical input 102 and provides a modulated optical output 104 using modulator driver 106 and a semiconductor portion 108, in this example a Ge(Si) portion. In various embodiments, the optical input 102 is connected to a light source that is optically coupled to the EAM. In various embodiments, the optical output 104 is connected to an optical link that is optically coupled to the EAM. According to an embodiment, the EAM 100 includes a temperature sensing element 120 and the corresponding circuit that senses the temperature of the electro-absorption modulator and provides an output signal 124 indicating the temperature. In an embodiment, the output signal 124 is used by a feedback circuit 122, together with a pre-determined relationship 126 between temperature and the signal from the sensor, to provide a current control signal 114 to current source 112. Current source 112 is configured to connect to temperature heating element 110 and the corresponding current controlling circuit that modulates current to the heating element 110 while the current controlling circuit is responsive to the output of the temperature sensing element 120, in various embodiments. In various embodiments, the feedback circuit is incorporated into the temperature control element. The temperature sensing element 120 provides a direct signal to the temperature control element based on sensed temperature, in an embodiment.

The temperature sensing element 120 and temperature heating element 110 are both integrated with an electro-absorption modulator 100 in a photonic integrated circuit, in various embodiments. In one embodiment, the temperature sensing element is adjacent to and closely thermally coupled to components of the EAM 100. The temperature sensing element 120 can be either metal material or doped Silicon material, utilizing their singular relationship between resistance and local temperature. The temperature heating element 110 can also be either metal material or doped Silicon material, utilizing one or both as a resistor to heat up the device. The temperature sensing and heating element can be separately designed in the system or the same element with both functions, in various embodiments. Thus, the local integrated heater and sensor are included in the EAM device design, and a temperature sensing and feedback circuit 122 is used to achieve the temperature control. In one embodiment, if the EAM is fabricated to operate at 70° C., when the sensor sensing the environmental temperature is lower than 55° C., a current will feedback to the heater to heat the device back up to 70° C.

Figure 3:
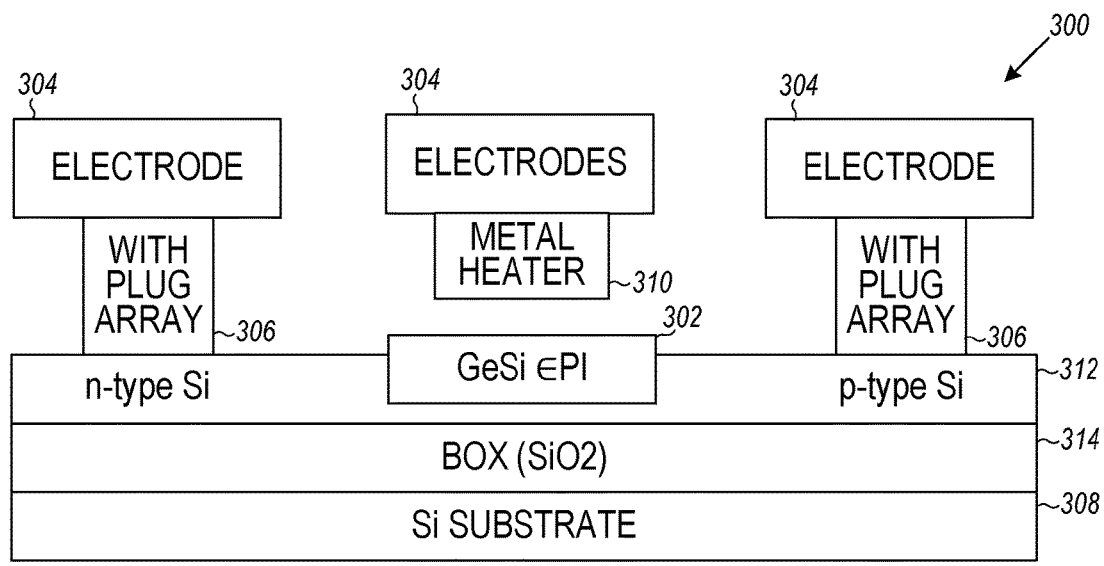
FIG. 3 illustrates a side view of an electro-absorption modulator with an integrated metal heating element, according to various embodiments.

FIG. 3 illustrates a side view of an electro-absorption modulator 300 with an integrated metal heating element 310, according to various embodiments. The modulator 300 includes a germanium silicon (GeSi) portion 302 in doped layer 312 configured to modulate light for transmission or reception of an optical signal. The modulator 300 includes a temperature control element, or metal heating element 310 in this embodiment, within the modulator configured to control temperature of the GeSi portion 302. The modulator 300 further includes electrodes 304, tungsten plug arrays 306, a buried oxide (BOX) layer 314 and a substrate 308, in various embodiments. In various embodiments, the integrated heating element functions as a resistor to heat up the device by current injection. The metal heating element 310 includes tungsten (W) and/or titanium nitride (TiN), in various embodiments. Other metals can be used without departing from the scope of the present subject matter. In various embodiments, the metal heating element 310 functions as a temperature sensor.

Figure 4:
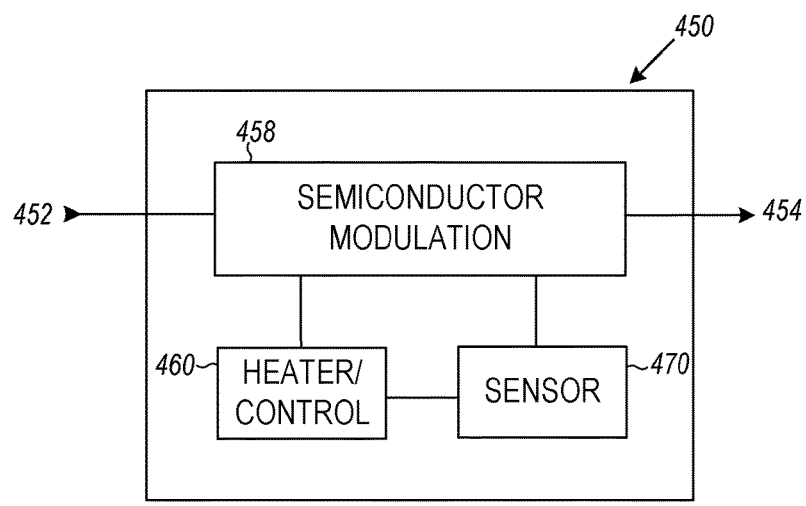
FIG. 4 is a block diagram illustrating a thermally controlled electro-absorption modulator for maintaining a desired temperature range during operation, according to various embodiments.

FIG. 4 is a block diagram illustrating a thermally controlled optical electro-absorption modulator 450 for maintaining a desired temperature range during operation, according to various embodiments. The EAM 450 includes a semiconductor portion 458 configured to modulate light for transmission or reception of an optical signal from input 452 to output 454. The EAM 450 includes a temperature sensing element 470 configured to sense temperature and to provide an output signal based on the sensed temperature, and a temperature control element 460 configured to control temperature of the semiconductor portion based on the output signal from the temperature sensing element. In one embodiment, the semiconductor portion 458 includes germanium silicon (GeSi). Other types of semiconductors can be used without departing from the scope of the present subject matter.

Figure 5:
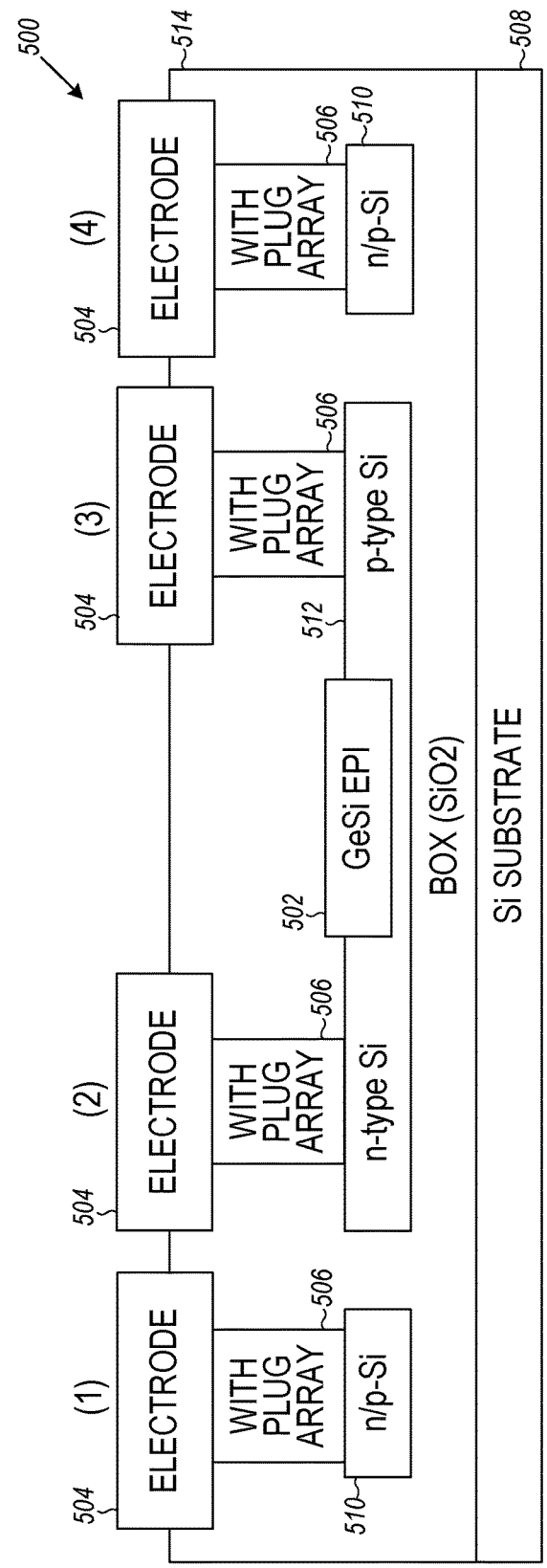
FIG. 5 illustrates a side view of an electro-absorption modulator with an integrated doped silicon heating element, according to various embodiments.

FIG. 5 illustrates a side (or cross-sectional) view of an electro-absorption modulator 500 with an integrated doped silicon heating element 510, according to various embodiments. The modulator 500 includes a germanium silicon (GeSi) portion 502 in doped layer 512 configured to modulate light for transmission or reception of an optical signal. The modulator 500 includes a temperature control element, or doped silicon heating element 510 in this embodiment, within the modulator 500 configured to control temperature of the GeSi portion 502. The modulator 500 further includes electrodes 504, tungsten plug arrays 506, a BOX layer 514 and a substrate 508, in various embodiments. In various embodiments, the doped silicon heating element 510 also functions as a temperature sensor.

Figure 6:
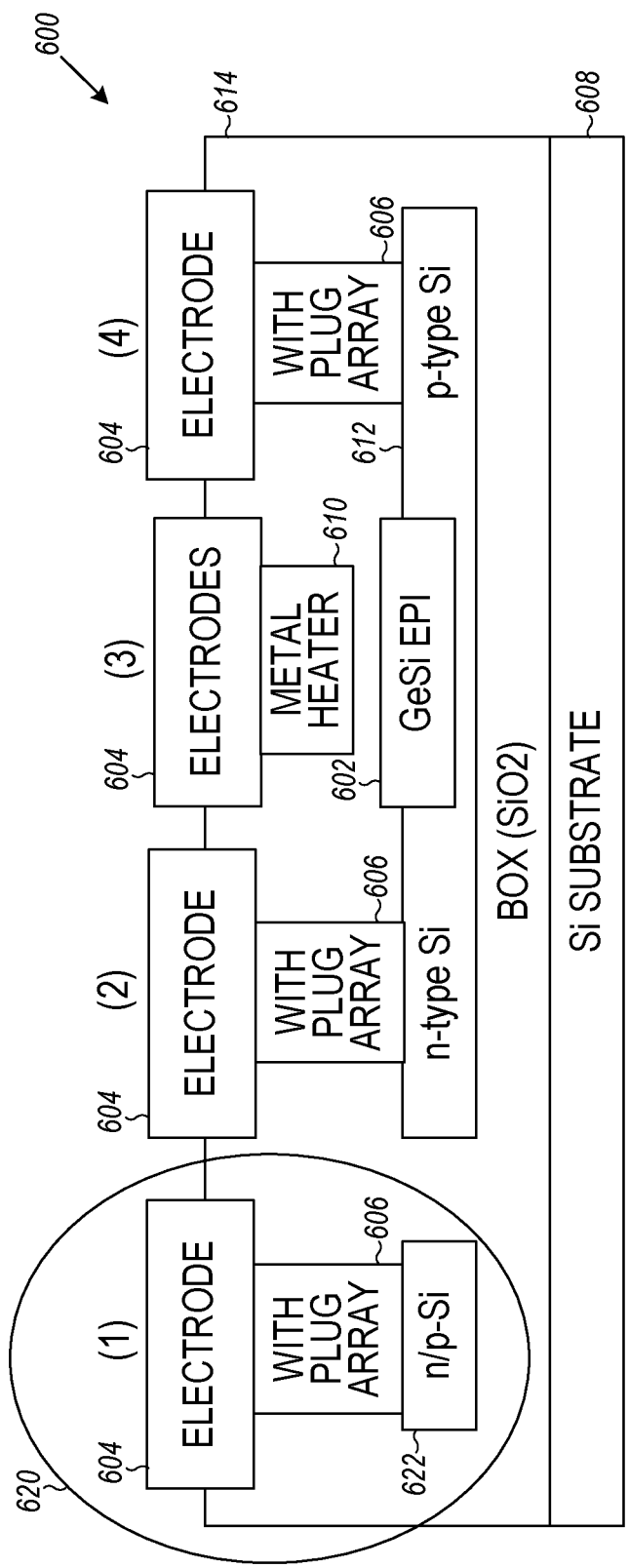
FIG. 6 illustrates a side view of an electro-absorption modulator with an integrated doped silicon temperature sensor, according to various embodiments.

FIG. 6 illustrates a side view of an electro-absorption modulator 600 with an integrated doped silicon temperature sensor 620, according to various embodiments. The modulator 600 includes a germanium silicon (GeSi) portion 602 in doped layer 612 configured to modulate light for transmission or reception of an optical signal. The modulator 600 includes a temperature sensing element 620, including a doped silicon portion 622 in this embodiment, within the modulator configured to sense temperature of the GeSi portion 602 and/or to sense environmental or ambient temperature, in various embodiments. The temperature sensing element 620 provides an output signal indicating the temperature to a temperature heating element 610 and corresponding current controlling circuit that modulates current to the heating element while the current controlling circuit is responsive to the output of the temperature sensing circuit. The modulator 600 further includes electrodes 604, tungsten plug arrays 606, a BOX layer 614 and a substrate 608, in various embodiments. In various embodiments, the integrated temperature sensor senses the environmental temperature, device temperature, or both. Because the resistance of metal or doped Si has a singular relationship with temperature, this material can be used to provide a signal corresponding to the temperature and/or change in temperature to a control circuit. In various embodiments, the GeSi (or other semiconductor) portion 602 is grown on a layer of the level of the temperature sensing element 620. In one embodiment, a monocrystalline Si layer on top of the BOX/Si substrate is doped to be used as a sensing element. In addition, GeSi material used for the modulator can be grown on the monocrystalline Si, in an embodiment.

Figure 7:
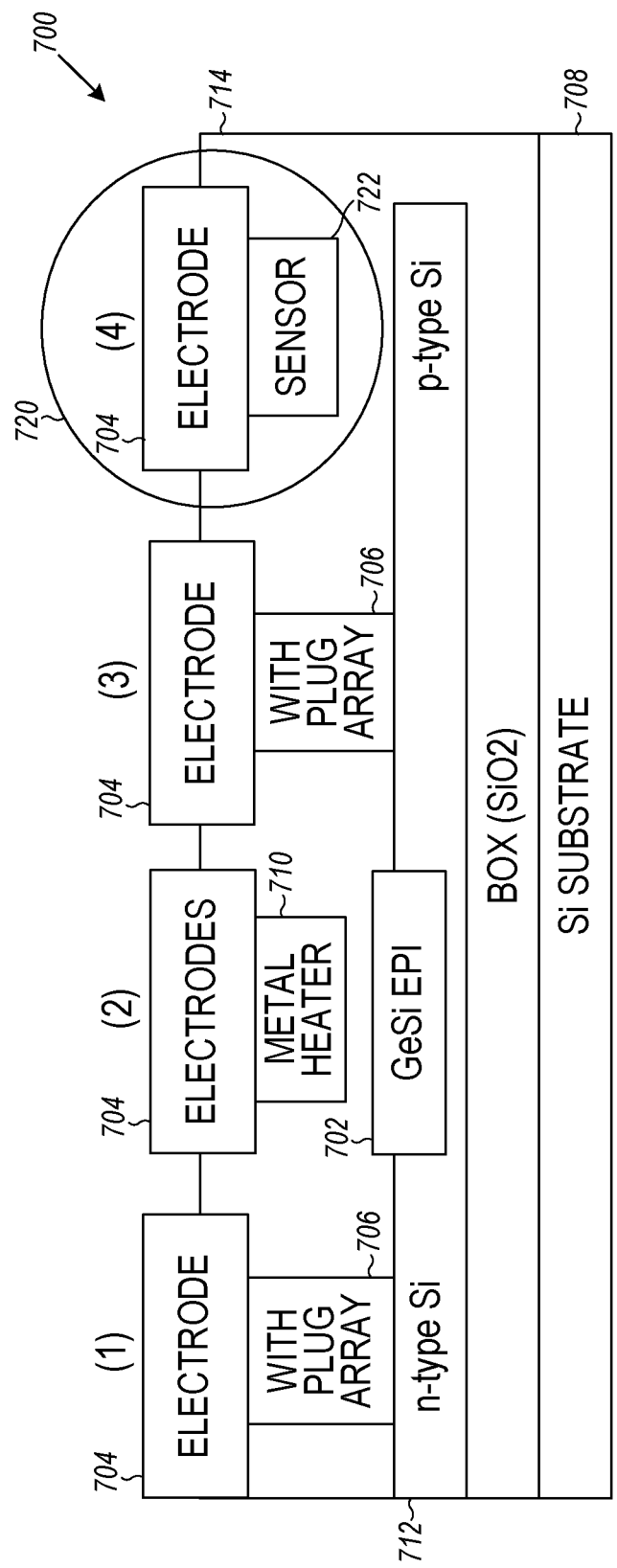
FIG. 7 illustrates a side view of an electro-absorption modulator with an integrated metal temperature sensor, according to various embodiments.

FIG. 7 illustrates a side view of an electro-absorption modulator 700 with an integrated metal temperature sensor 720, according to various embodiments. The modulator 700 includes a germanium silicon (GeSi) portion 702 in doped layer 712 configured to modulate light for transmission or reception of an optical signal. The modulator 700 includes a temperature sensing element 720, including a doped silicon portion 722 in this embodiment, within the modulator configured to sense temperature of the GeSi portion 702 and/or to sense environmental or ambient temperature, in various embodiments. The temperature sensing element 720 provides an output signal indicating the temperature to a temperature heating element 710 and corresponding current controlling circuit that modulates current to the heating element while the current controlling circuit is responsive to the output of the temperature sensing circuit. The modulator 700 further includes electrodes 704, tungsten plug arrays 706, a BOX layer 714 and a substrate 708, in various embodiments.

The present subject matter provides several benefits. By enabling the use of an EAM-based optical modulator in the transceiver, the provided temperature control can be implemented if the environmental temperature change is larger than a programmable amount, such 36° C., in an embodiment. The advantages of EAM-based optical modulators, which can be used for optical links in data center, backplane and board-to-board applications, can be provided without regard to temperature change, using the present subject matter.

Methods, apparatus, and systems are provided including an electro-absorption modulator (EAM) with local temperature control for optical communication. One aspect provides an optical EAM including a semiconductor portion configured to modulate light for transmission or reception of an optical signal. The modulator includes a temperature sensing element configured to sense temperature and to provide an output signal based on the sensed temperature, and a temperature control element configured to control temperature of the semiconductor portion based on the output signal from the temperature sensing element. In one embodiment, the semiconductor portion includes germanium silicon (GeSi). Other types of semiconductors can be used without departing from the scope of the present subject matter.

According to various embodiments, the temperature sensing element is configured to sense environmental temperature. The temperature sensing element is configured to sense temperature of the GeSi portion, in various embodiments. In various embodiments, the temperature control element includes Tungsten (W), titanium nitride (TiN), and/or doped silicon (Si). The temperature control element is configured to function as a resistor to increase temperature of the GeSi portion using current injection, in various embodiments.

Another aspect provides an optical integrated circuit including an optical electro-absorption modulator including a germanium silicon (GeSi) portion configured to modulate light for transmission or reception of an optical signal. The integrated circuit includes a temperature sensing element within the modulator configured to sense environmental temperature of the modulator and to provide an output signal based on the sensed temperature, and a temperature control element within the modulator configured to control temperature of the GeSi portion based on the output signal from the temperature sensing element. According to various embodiments, the temperature sensing element includes doped silicon (Si) and/or a metal. The temperature sensing element includes resistance-based temperature sensing, in various embodiments.

A further aspect provides an optical communication system including an optical input, an optical output, and an optical electro-absorption modulator (EAM) configured to connect the optical input to the optical output. The optical EAM includes a germanium silicon (GeSi) portion configured to modulate light for transmission or reception of an optical signal. The optical EAM further includes a temperature sensing element configured to sense temperature of the GeSi portion and to provide an output signal based on the sensed temperature, and a temperature control element configured to control temperature of the GeSi portion based on the output signal from the temperature sensing element.

According to various embodiments, the optical input includes a chip-to-chip level communication. The optical input includes a board-to-board level communication, in various embodiments. The optical EAM is configured to be incorporated into an optical transceiver, in an embodiment. In various embodiments, the temperature sensing element is further configured to sense environmental temperature.

Another aspect provides a method including providing an optical electro-absorption modulator (EAM) including a semiconductor portion configured to modulate light for transmission or reception of an optical signal. The method also includes providing a temperature sensing element within the modulator configured to sense temperature and to provide an output signal based on the sensed temperature, and providing a temperature control element within the modulator configured to control temperature of the semiconductor portion based on the output signal from the temperature sensing element. In one embodiment, the semiconductor portion includes germanium silicon (GeSi).

According to various embodiments, the temperature sensing element is configured to sense environmental temperature. The temperature sensing element is configured to sense temperature of the semiconductor portion, in various embodiments. In one embodiment, the temperature sensing element is configured to sense both temperature of the GeSi portion, and environmental or ambient temperature. The EAM is configured to operate at approximately 70 degrees C., and if the temperature sensing element senses a temperature below 55 degrees C., the temperature control element is configured to begin heating the EAM, in an embodiment. Other temperature ranges can be used without departing from the scope of the present subject matter.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 8:
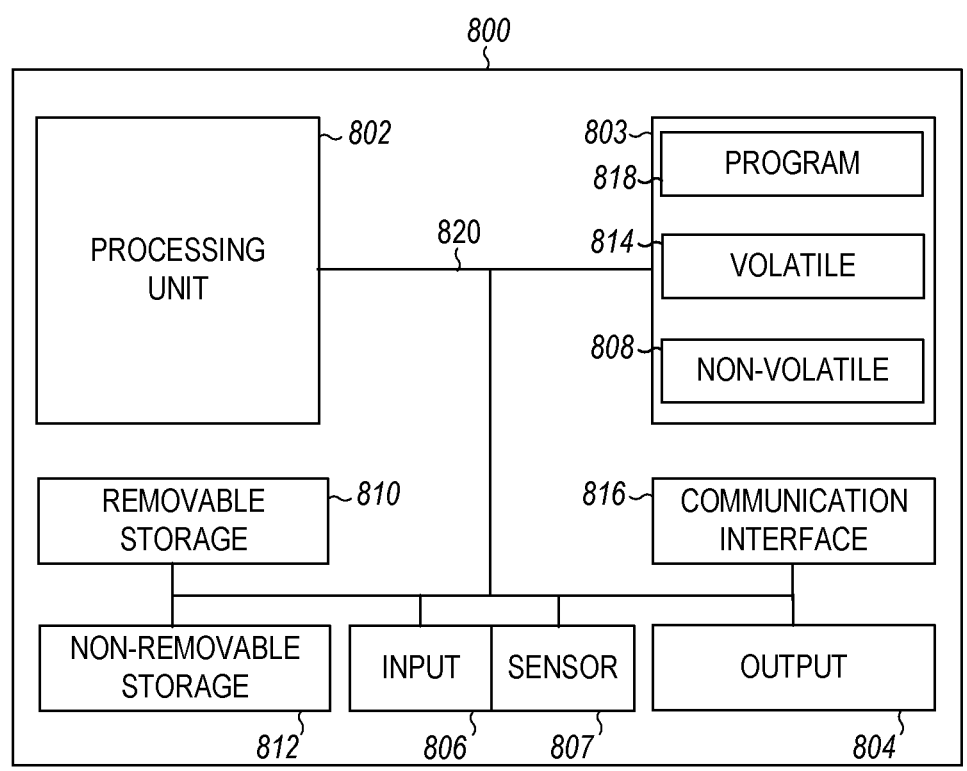
FIG. 8 is a diagram illustrating circuitry for implementing devices to perform methods according to an example embodiment.

FIG. 8 is a schematic diagram illustrating circuitry for performing methods according to example embodiments. All components need not be used in various embodiments. For example, the computing devices may each use a different set of components and storage devices.

One example computing device in the form of a computer 800 may include a processing unit 802, memory 803, removable storage 810, and non-removable storage 812 coupled by a bus 820. Although the example computing device is illustrated and described as computer 800, the computing device may be in different forms in different embodiments. For example, the computing device may instead be a smartphone, a tablet, smartwatch, or other computing device including the same or similar elements as illustrated and described with regard to FIG. 8. Devices such as smartphones, tablets, and smartwatches are generally collectively referred to as mobile devices. Further, although the various data storage elements are illustrated as part of the computer 800, the storage may also or alternatively include cloud-based storage accessible via a network, such as the Internet or server based storage.

Memory 803 may include volatile memory 814 and/or non-volatile memory 808. Computer 800 may include—or have access to a computing environment that includes—a variety of computer-readable media, such as volatile memory 814 and/or non-volatile memory 808, removable storage 810 and/or non-removable storage 812. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Storage can also include networked storage such as a storage area network (SAN).

Computer 800 may include or have access to a computing environment that includes input 806, output 804, and a communication interface 816. In various embodiments, communication interface 816 includes a transceiver and an antenna. Output 804 may include a display device, such as a touchscreen, that also may serve as an input device. The input 806 may include one or more of a touchscreen, touchpad, mouse, keyboard, camera, one or more device-specific buttons, one or more sensors 807 integrated within or coupled via wired or wireless data connections to the computer 800, or other input devices. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions, i.e., a program 818, comprises instructions stored on a computer-readable medium that are executable by the processing unit 802 of the computer 800. The terms computer-readable medium and storage device do not include carrier waves to the extent carrier waves are deemed too transitory.

In one example, the processing unit 802 executes the program 818 to sense temperature of an optical electro-absorption modulator, provides an output signal based on the sensed temperature, and controls a temperature of a temperature control element based on the output signal from the temperature sensing element, wherein the optical electro-absorption modulator modulates light for transmission or reception of an optical signal.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. An optical electro-absorption modulator, comprising:
a semiconductor portion configured to modulate light for transmission or reception of an optical signal;
a temperature sensing element configured to sense temperature and to provide an output signal based on the sensed temperature; and
a temperature control element configured to control temperature of the semiconductor portion based on the output signal from the temperature sensing element, the temperature control element including a heating element and a current control circuit that modulates current to the heating element based on the output signal.

2. The modulator of claim 1, wherein the semiconductor portion includes germanium silicon (GeSi).

3. The modulator of claim 1, wherein the temperature sensing element is configured to sense environmental temperature.

4. The modulator of claim 1, wherein the temperature sensing element is configured to sense temperature of the semiconductor portion.

5. The modulator of claim 1, wherein the temperature control element includes Tungsten (W).

6. The modulator of claim 1, wherein the temperature control element includes titanium nitride (TiN).

7. The modulator of claim 1, wherein the temperature control element includes doped silicon (Si).

8. The modulator of claim 1, wherein the temperature control element is configured to function as a resistor to increase temperature of the semiconductor portion using current injection.

9. An optical integrated circuit, comprising:
an optical electro-absorption modulator including a germanium silicon (GeSi) portion configured to modulate light for transmission or reception of an optical signal;
a temperature sensing element within the modulator configured to sense environmental temperature of the modulator and to provide an output signal based on the sensed temperature; and
a temperature control element within the modulator configured to control temperature of the GeSi portion based on the output signal from the temperature sensing element, the temperature control element including a heating element and a current control circuit that modulates current to the heating element based on the output signal.

10. The integrated circuit of claim 9, wherein the temperature sensing element includes doped silicon (Si).

11. The integrated circuit of claim 9, wherein the temperature sensing element includes a metal.

12. The integrated circuit of claim 9, wherein the temperature sensing element includes resistance-based temperature sensing.

13. An optical communication system, comprising:
an optical input;
an optical output; and
an optical electro-absorption modulator (EAM) configured to connect the optical input to the optical output, the optical EAM including:
a germanium silicon (GeSi) portion configured to modulate light for transmission or reception of an optical signal;
a temperature sensing element configured to sense temperature of the GeSi portion and to provide an output signal based on the sensed temperature; and
a temperature control element configured to control temperature of the GeSi portion based on the output signal from the temperature sensing element, the temperature control element including a heating element and a current control circuit that modulates current to the heating element based on the output signal.

14. The system of claim 13, wherein the optical input includes a chip-to-chip level communication.

15. The system of claim 13, wherein the optical input includes a board-to-board level communication.

16. The system of claim 13, wherein the optical EAM is configured to be incorporated into an optical transceiver.

17. The system of claim 13, wherein the temperature sensing element is further configured to sense environmental temperature.

18. A method, comprising:
providing an optical electro-absorption modulator (EAM) including a semiconductor portion configured to modulate light for transmission or reception of an optical signal;

sensing a temperature using a temperature sensing element within the modulator and producing an output signal based on the sensed temperature; and controlling temperature of the semiconductor portion using a temperature control element within the modulator based on the output signal from the temperature sensing element, the temperature control element including a heating element and a current control circuit that modulates current to the heating element based on the output signal.

19. The method of claim 18, wherein the semiconductor portion includes germanium silicon (GeSi).

20. The method of claim 18, wherein the temperature sensing element is configured to sense environmental temperature.

21. The method of claim 18, wherein the temperature sensing element is configured to sense temperature of the semiconductor portion.

\* \* \* \* \*